US010896137B2

(12) United States Patent
Best et al.

(10) Patent No.: US 10,896,137 B2
(45) Date of Patent: Jan. 19, 2021

(54) NON-VOLATILE MEMORY FOR SECURE STORAGE OF AUTHENTICATION DATA

(71) Applicant: Cryptography Research, Inc., Sunnyvale, CA (US)

(72) Inventors: Scott C. Best, Palo Alto, CA (US); Brent S. Haukness, Monte Sereno, CA (US); Carl W. Werner, Los Gatos, CA (US)

(73) Assignee: Cryptography Research, Inc., San Jose, CA (US)

( * ) Notice: Subject to any disclaimer, the term of this patent is extended or adjusted under 35 U.S.C. 154(b) by 55 days.

(21) Appl. No.: 16/420,629

(22) Filed: May 23, 2019

(65) Prior Publication Data

US 2019/0370191 A1  Dec. 5, 2019

Related U.S. Application Data

(63) Continuation of application No. 15/469,999, filed on Mar. 27, 2017, now Pat. No. 10,303,623.
(Continued)

(51) Int. Cl.
*G06F 12/02* (2006.01)
*G06F 12/14* (2006.01)
(Continued)

(52) U.S. Cl.
CPC ........ *G06F 12/1466* (2013.01); *G06F 3/0622* (2013.01); *G06F 3/0679* (2013.01);
(Continued)

(58) Field of Classification Search
None
See application file for complete search history.

(56) References Cited

U.S. PATENT DOCUMENTS 6,442,286 B1  8/2002  Kramer
7,193,901 B2  3/2007  Ruby et al.
(Continued)

OTHER PUBLICATIONS

Cai, Yu et al., "Read Disturb Errors in MLC NAND Flash Memory: Characterization, Mitigation, and Recovery", 2015 45th Annual IEEE/IFIP International Conference on Dependable Systems and Networks, IEEE Computer Society, Sep. 17, 2015, pp. 438-449. 12 Pages.

*Primary Examiner* — Christopher D Birkhimer
(74) *Attorney, Agent, or Firm* — Lowenstein Sandler LLP (57) ABSTRACT

A first non-volatile memory may store first data and a second non-volatile memory may store second data. An authentication component may be coupled with the first non-volatile memory and the second non-volatile memory and may receive a request to perform an authentication operation. In response to the request to perform the authentication operation, the authentication component may access the first data stored at the first non-volatile memory and the second data stored at the second non-volatile memory and determine whether the second data stored at the second non-volatile memory has become unreliable based on a memory disturbance condition. In response to determining that the second data stored at the second non-volatile memory has become unreliable, a corrective action associated with the first data stored at the first non-volatile memory may be performed.

20 Claims, 8 Drawing Sheets

Related U.S. Application Data (60) Provisional application No. 62/320,297, filed on Apr. 8, 2016.

(51) Int. Cl.
| | | |
|---|---|---|
| *G06F 21/44* | (2013.01) | |
| *G06F 21/55* | (2013.01) | |
| *G06F 21/75* | (2013.01) | |
| *G06F 21/79* | (2013.01) | |
| *G06F 3/06* | (2006.01) | |
| *G11C 13/00* | (2006.01) | |
| *G11C 7/24* | (2006.01) | |
| *H04L 9/00* | (2006.01) | |
| *H04L 9/08* | (2006.01) | |
| *H04L 9/32* | (2006.01) | |

(52) U.S. Cl.
CPC .......... *G06F 12/0246* (2013.01); *G06F 21/44* (2013.01); *G06F 21/556* (2013.01); *G06F 21/75* (2013.01); *G06F 21/79* (2013.01); *G11C 13/0059* (2013.01); *H04L 9/003* (2013.01); *H04L 9/0894* (2013.01); *H04L 9/321* (2013.01); *H04L 9/3226* (2013.01); *G06F 2212/202* (2013.01); *G11C 7/24* (2013.01)

(56) References Cited

U.S. PATENT DOCUMENTS

| | | | |
|---|---|---|---|
| 7,920,423 | B1 | 4/2011 | Ma et al. |
| 8,031,521 | B1 | 10/2011 | Yang |
| 8,264,880 | B1 | 9/2012 | Yang |
| 8,503,257 | B2 | 8/2013 | Post et al. |
| 8,661,184 | B2 | 2/2014 | Wood et al. |
| 8,725,936 | B2 | 5/2014 | Oikawa et al. |
| 8,873,286 | B2 | 10/2014 | Strasser et al. |
| 8,909,942 | B1 | 12/2014 | Obukhov et al. |
| 8,982,619 | B2 | 3/2015 | Strasser et al. |
| 9,063,844 | B2 | 6/2015 | Higgins et al. |
| 9,104,646 | B2 | 8/2015 | Zheng et al. |
| 9,111,621 | B2 | 8/2015 | Krutzik et al. |
| 9,501,343 | B2 | 11/2016 | Kim |
| 2002/0090117 | A1 | 7/2002 | Kramer |
| 2008/0288814 | A1 | 11/2008 | Kitahara |
| 2009/0172267 | A1 | 7/2009 | Oribe et al. |
| 2009/0220088 | A1 | 9/2009 | Lu et al. |
| 2013/0132652 | A1 | 5/2013 | Wood et al. |
| 2013/0262749 | A1 | 10/2013 | Oikawa et al. |
| 2014/0108891 | A1 | 4/2014 | Strasser et al. |
| 2014/0237200 | A1 | 8/2014 | Dar |
| 2015/0006984 | A1 | 1/2015 | Strasser et al. |
| 2015/0082039 | A1* | 3/2015 | Stalzer ................ H04L 63/0428 713/171 |
| 2015/0149817 | A1 | 5/2015 | Strasser et al. |
| 2015/0172054 | A1* | 6/2015 | Prakash ................ H04L 9/3263 713/189 |
| 2015/0339188 | A1 | 11/2015 | Hu et al. |
| 2015/0348644 | A1 | 12/2015 | Dar |
| 2016/0034327 | A1 | 2/2016 | Kim |
| 2016/0034390 | A1 | 2/2016 | Mun et al. |

* cited by examiner

NON-VOLATILE MEMORY FOR SECURE STORAGE OF AUTHENTICATION DATA

RELATED APPLICATION

This application is a continuation of U.S. patent application Ser. No. 15/469,999 filed on Mar. 27, 2017, which claims the benefit under 35 U.S.C. § 119(e) of U.S. Provisional Application 62/320,297 filed on Apr. 8, 2016, each of which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to a non-volatile memory that is used for secure storage of authentication data. A device may read or retrieve data stored in the non-volatile memory in order to generate an authentication proof that may be used to authenticate the device. For example, in response to a request to authenticate the device, the data stored in the non-volatile memory may be read or retrieved to generate the authentication proof each time the device is to be authenticated.

An unauthorized entity may seek to obtain the data from the non-volatile memory of the device. For example, the unauthorized entity may be an attacker who seeks to obtain a cryptographic key or other such secret information from the non-volatile memory that is used to generate the authentication proof. An example of an attack used by the unauthorized entity may be a side channel attack such as, but not limited to, Differential Power Analysis (DPA) where the unauthorized entity may obtain the secret information from the device by studying the power consumption of circuitry of the device. For example, the circuitry of the device may include a cryptographic hardware circuit that may be used to generate the authentication proof. The unauthorized entity may analyze the power consumption measurements of the cryptographic hardware circuit over a period of time as the operations to generate the authentication proof based on the secret information or data retrieved from the non-volatile memory are performed. In order to obtain the secret information or data by studying the power consumption measurements, the unauthorized entity may repeatedly generate the authentication proof. Thus, the unauthorized entity may manipulate the device to repeatedly read or retrieve the secret information or data stored in the non-volatile memory a large number of times as the authentication proof is repeatedly generated by the unauthorized entity during the DPA attack.

Aspects of the present disclosure may address the above and other deficiencies with regard to security of the secret information or data by storing the secret information or data in a non-volatile memory that becomes less reliable each time the secret information or data is read or retrieved from the non-volatile memory. The non-volatile memory may be reliable for a threshold number of read accesses of data (e.g., the secret information), where the threshold number may correspond to a number that is indicative of a behavior of an authorized entity (e.g., a user of the device under normal behavior or conditions). However, since an unauthorized entity may repeatedly read or retrieve the secret information or data from the non-volatile memory during an attack of the device, after the threshold number of read accesses of the data has been exceeded, the reliability of the non-volatile memory device may be degraded so that the secret information or data may no longer reliably or accurately be read or retrieved. As such, the resulting authentication proof that is generated may not be a valid authentication proof so that the attacker analyzing the power consumption of the invalid authentication proof may not be able to derive the secret information or data.

The non-volatile memory may be any type of memory that becomes less reliable in response to read accesses or retrievals of data stored in the non-volatile memory. For example, the non-volatile memory may be a resistive memory such as a resistive random access memory (RRAM). The resistive memory may include cells for storing data. Each time that a cell of the resistive memory is accessed, the analog resistance of the cell may slightly change. After a number of read accesses or retrievals of the data stored in the cells of the resistive memory, the resistance of a particular cell may change an amount so that the cell of the resistive memory may be considered to be disturbed (e.g., the resistance of the cell has changed and is no longer within a range that represents the digital data was stored into the cell). Such a degradation in the reliability of the data stored in the resistive memory due to repeated read accesses may be referred to as read disturb or a memory disturbance condition.

The non-volatile memory that becomes less reliable in response to successive read accesses may be used to enhance the security of secret information or data stored at the device. For example, a cryptographic key that is used to generate an authentication proof that is used to authenticate the device may be generated based on data stored in the non-volatile memory that becomes less reliable in response to each read access. Thus, when the unauthorized entity attempts to derive the secret information or data by repeatedly generating the authentication proof with read accesses of the secret information or data stored in the non-volatile memory, the data stored in the non-volatile memory may become unreliable after the unauthorized entity performs an excessive number of operations that correspond to a read access of the non-volatile memory. As a result, the authentication proof that is generated by the unauthorized entity may not be a valid authentication proof and the unauthorized entity may not be able to obtain the secret information or data.

As an example, a first non-volatile memory, such as a one-time programmable (OTP) memory, may store a first cryptographic key. A second non-volatile memory, such as a resistive memory, may store additional data that is to be used with the first cryptographic key to generate a second cryptographic key that may be used to generate an authentication proof for authenticating a device that includes the first and second non-volatile memories. For example, the second cryptographic key may be generated based on a combination of the first cryptographic key and the additional data. The additional data may correspond to a mask or a decryption key for the first cryptographic key. Thus, when the unauthorized entity performs an operation that repeatedly accesses the second non-volatile memory, after a certain number of read accesses, the additional data stored in the second non-volatile memory may become unreliable and the second cryptographic key may no longer be reliably generated which results in an invalid authentication proof being generated.

Figure 1:
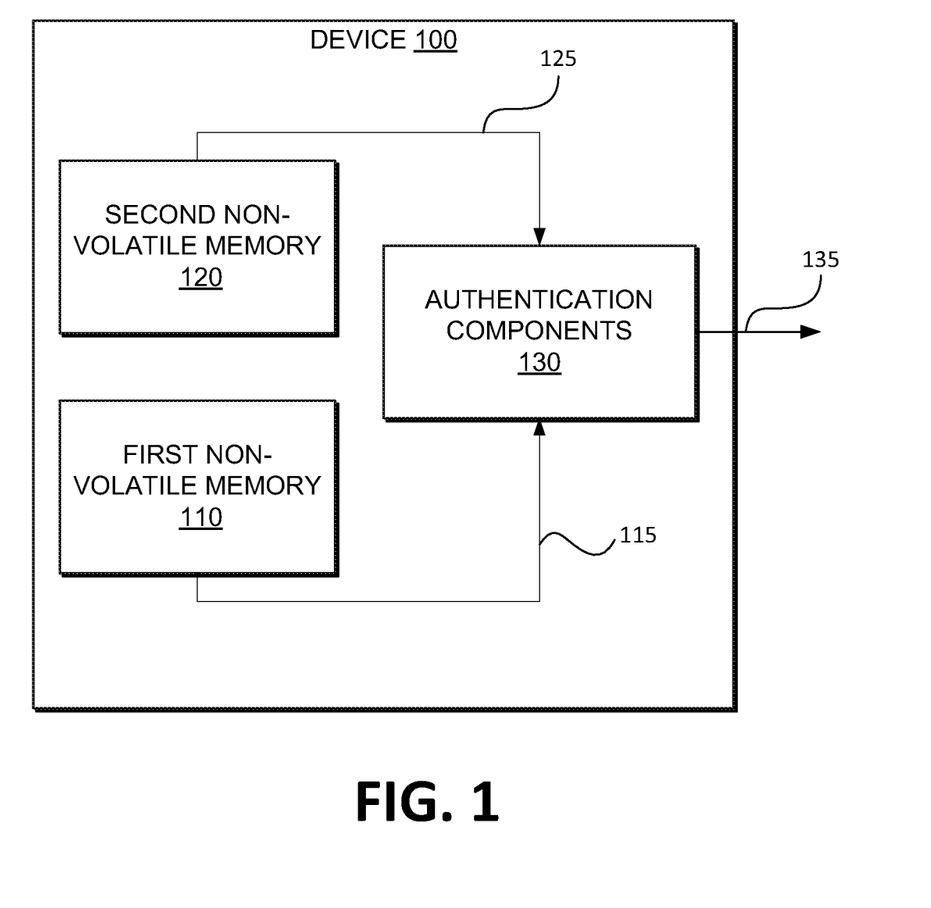
FIG. 1 illustrates an example device that includes a first type of non-volatile memory and a second type of non-volatile memory for secure authentication data in accordance with some embodiments.

FIG. 1 illustrates an example device 100 that includes a first type of non-volatile memory and a second type of non-volatile memory for secure authentication data. In general, the device 100 may include a first non-volatile memory 110 and a second non-volatile memory 120 where read accesses of the second non-volatile memory 120 may result in the data stored in the second non-volatile memory 120 being less reliable.

As shown in FIG. 1, the device 100 may include a first non-volatile memory 110 that may correspond to a non-volatile memory that may store a cryptographic key 115 and a second non-volatile memory 120 that may store additional data 125. The first non-volatile memory 110 may have a different memory disturbance condition (e.g., a different read disturb characteristic) than the second non-volatile memory 120. For example, the first non-volatile memory 110 may be associated with a with circuitry that mitigates a memory disturbance condition that is a result of read accesses of the cryptographic key 115 stored at the first non-volatile memory 110. Furthermore, the second non-volatile memory 120 may become less reliable in response to each read access of the additional data 125 stored at the second non-volatile memory 120. In some embodiments, the second non-volatile memory 120 may be a resistive memory that does not use circuitry that mitigates a memory disturbance condition (e.g., read disturb) that is a result of read accesses of the additional data 125 stored at the second non-volatile memory 120. Thus, the first non-volatile memory 110 may remain reliable (e.g., the cryptographic key stored is reliable) and may not become less reliable in response to each successive read access or may be associated with a mitigation circuitry in response to successive read accesses, but the second non-volatile memory 120 may become less reliable in response to each successive read access. As such, the second non-volatile memory 120 may reach a state of unreliability earlier than the first non-volatile memory 110 in response to the same number of read accesses to each respective non-volatile memory.

Referring to FIG. 1, authentication components 130 of the device may generate an authentication proof 135 that is based on the cryptographic key 115 stored at the first non-volatile memory 110 and the additional data 125 stored at the second non-volatile memory 120. For example, in response to a first request to authenticate the device 100, a first read access of the cryptographic key 115 stored at the first non-volatile memory 110 and a first read access of the additional data 125 stored at the second non-volatile memory 120 may be performed. The second non-volatile memory 120 may become less reliable as a result of the first read access. In response to subsequent requests to authenticate the device 100, additional read accesses of the cryptographic key 115 stored at the first non-volatile memory 110 may be performed. Furthermore, additional read accesses of the additional data 125 stored at the second non-volatile memory 120 may also be performed. After exceeding a threshold number of read accesses, the first non-volatile memory 110 may remain reliable (e.g., after mitigation of the memory disturbance condition), but the second non-volatile memory 120 may no longer be reliable. Thus, when the threshold number of read accesses are exceeded as a result of an excessive number of requests to authenticate the device 100, the authentication proof 135 that is generated based on the cryptographic key 115 stored at the first non-volatile memory 110 and the now unreliable second non-volatile memory 120 storing the additional data 125 may not be used by the authentication components 130 to generate a valid authentication proof 135.

Figure 2:
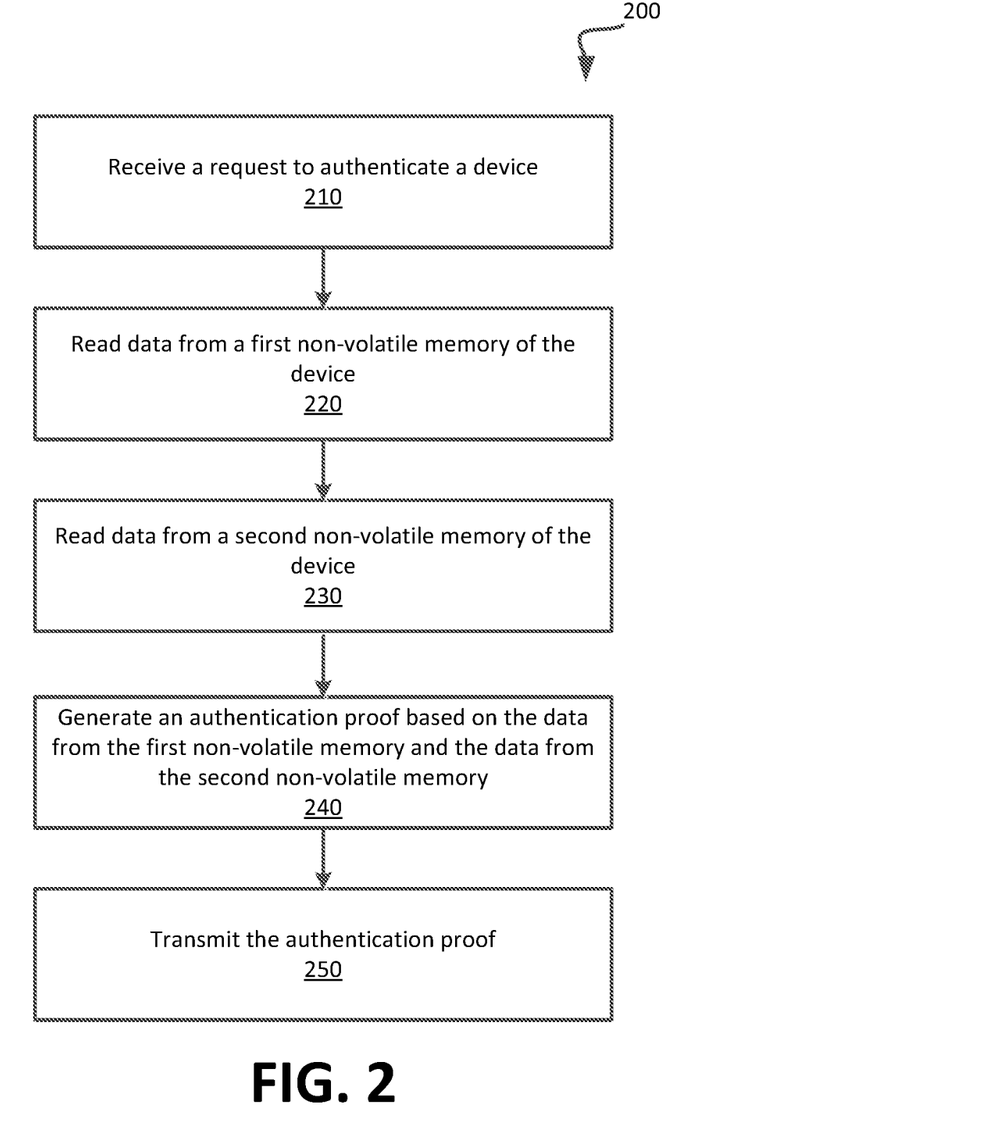
FIG. 2 is a flow diagram of an example method to generate an authentication proof based on data from the first non-volatile memory and the second non-volatile memory in accordance with some embodiments.

FIG. 2 is a flow diagram of an example method 200 to generate an authentication proof based on data from the first non-volatile memory and the second non-volatile memory. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the authentication components 130 of FIG. 1.

As shown in FIG. 2, the method 200 may begin with the processing logic receiving a request to authenticate a device (block 210). The device may interact with another device that transmits the authentication request. In some embodiments, the device may be a peripheral component and the other device may use the peripheral component. For example, the device may be a printer cartridge and the other device may be a printer. The processing logic may further read data from a first non-volatile memory of the device (block 220). For example, in response to the request to authenticate the device, a read access of data stored at the first non-volatile memory may be performed. The data may be a cryptographic key. Furthermore, the processing logic may read data from a second non-volatile memory of the device (block 230). For example, a read access of data stored at the second non-volatile memory may be performed in response to the request to authenticate the device or in response to the read access of the first non-volatile memory. The data stored at the second non-volatile memory may be additional data, such as a mask for the cryptographic key or a decryption key that may be used to decrypt an encrypted version of the cryptographic key. Furthermore, the first non-volatile memory may be a first type of memory and the second non-volatile memory may be a different second type of memory that becomes less reliable in response to the reading of data at the second non-volatile memory device or is not associated with a mitigation circuitry to mitigate a memory disturbance condition. The processing logic may subsequently generate an authentication proof based on the data from the first non-volatile memory and the data from the second non-volatile memory (block 240). For example, the authentication proof may be based on a combination of the cryptographic key that is stored at the first non-volatile memory that may not become less reliable in response to a read access (or is associated with mitigation circuitry) and additional data stored at the second non-volatile memory that may become less reliable in response to a read access. Furthermore, the processing logic may transmit the authentication proof (block 250). For example, the authentication proof may be transmitted to another device to authenticate the device that includes the first non-volatile memory and the second non-volatile memory.

As such, a request to authenticate a device may result in an access to data stored at two different types of non-volatile memory where one of the types of non-volatile memory may become less reliable in response to each read access of data stored at the non-volatile memory.

Figure 3A:
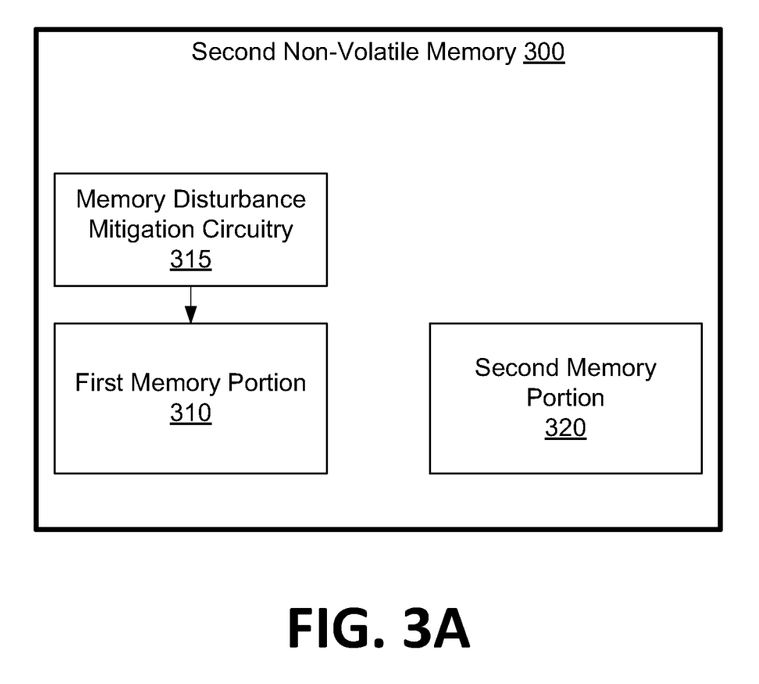
FIG. 3A is a block diagram of an example non-volatile memory with different characteristics associated with memory disturbance in accordance with some embodiments of the present disclosure.

FIG. 3A is a block diagram of an example non-volatile memory 300 with two different characteristics associated with memory disturbance. In general, the non-volatile memory 300 may correspond to the second non-volatile memory 120 of FIG. 1.

As shown in FIG. 3A, the second non-volatile memory 300 may be a resistive memory that includes a first memory portion 310 that is associated with a memory disturbance mitigation circuitry 315 and a second memory portion 320 that is not associated with a memory disturbance mitigation circuitry. The first memory portion 310 may store data that may be retrieved in response to a read access and the second memory portion 320 may store additional data that may be retrieved in response to another read access.

The first memory portion 310 and the second memory portion 320 may include memory cells for storing data (e.g., authentication data, cryptographic keys, etc.). The memory cells may store single or multibit data as an analog state that upon a read access may be interpreted as a corresponding digital value. The memory cells may be reset to store an analog state corresponding to a first digital state (e.g. digital 0), and set to store another analog state corresponding to a different second digital state (e.g. digital 1). Furthermore, the memory cells may be resistive memory cells that have a programmable resistance, and the resistance of the cell represents the analog state of the memory cell. Each time a resistive memory cell is accessed (e.g., in response to a request to authenticate a device or to generate an authentication proof), the analog resistance of the memory cell of the resistive memory may slightly change. After a number of read accesses, the resistance of the memory cell may change enough so that the memory cell is considered to be disturbed (i.e., the resistance of the cell no longer lies in an analog range that accurately represents the digital data that was originally programmed into the cell).

The presence of such a memory disturbance condition (e.g., a read disturb) may indicate that the data stored in the corresponding non-volatile memory may be or may soon become unreliable due to the repeated read accesses of the second non-volatile memory 300. The first memory portion 310 may include or be coupled to a memory disturbance mitigation circuitry 315 that may perform a recovery operation for the first memory portion 310. The memory disturbance mitigation circuitry 315 may mitigate any memory disturbance condition including, but not limited to, a read disturb condition. For example, the recovery operation may be performed when the memory disturbance mitigation circuitry 315 identifies an accumulation of disturbance at the first memory portion 310 or when the accumulation of disturbance exceeds a threshold. The recovery operation may correspond to a reprogramming of the data stored at the memory cells of the first memory portion 310. For example, the memory cells may be reprogrammed with data values that were previously read from the memory cells in response to previous read accesses. Thus, the memory cells may be refreshed with their own data to compensate for a degradation in reliability of the first memory portion 310 that is a result of the repeated read accesses.

In some embodiments, the recovery operation may correspond to touching up the memory cells of the first memory portion 310 as opposed to reprogramming of the memory cells. The touch up operation may reduce the memory disturbances, or read disturbances, by applying a shorter and/or lower voltage pulse than may be used when programming the memory cells. For example, during a read access of the first memory portion 310, the memory cells may be biased in the programmed direction. In response to repeated read accesses over time, the resistance of memory cells may move towards the programmed state or direction. The accumulated disturbances may be reduced by applying a short reset pulse to the memory cells of the first memory portion 310 in the reset state. The touch up operation may be faster than a normal programming operation and may reduce the impact of the disturbance correction operation on the first memory portion 310.

As such, a resistive memory, or other such non-volatile memory that may accumulate a memory disturbance condition, may include a first memory portion and a second memory portion. The first memory portion may be operatively coupled with circuitry that mitigates the memory disturbance condition in the first memory portion while the second memory portion may not be operatively coupled with such circuitry. Thus, in response to multiple read access for data stored at the first memory portion and data stored at the second memory portion, a disturbance condition may accumulate at the first memory portion and may be mitigated by the circuitry while the disturbance condition for the second memory portion may not be mitigated by the circuitry. For example, after a first number of read accesses, the first memory portion and the second memory portion may be associated with a first accumulation of memory disturbances. The memory disturbance mitigation circuitry may mitigate or remove the effects of the memory disturbances for the first memory portion while not mitigating or removing the effects of the memory disturbances for the second memory portion. After a second number of read accesses, the first memory portion may then be associated with a second accumulation of memory disturbances while the second memory portion may be associated with a combined first and second accumulation of memory disturbances.

In the same or alternative embodiments, the first memory portion and the second memory portion may have different tolerances with respect to the memory disturbance condition and neither the first memory portion nor the second memory portion may be coupled with memory disturbance mitigation circuitry. The first memory portion may be more robust to a memory disturbance condition than the second memory portion. For example, the first memory portion may be designed differently than the second memory portion. The difference may correspond to different read voltages, write conditions, or different physical characteristics for each of the first memory portion and the second memory. For example, in response to an authentication request, the first memory portion may be accessed by a read request of a first voltage and the second memory portion may be accessed by a read request of a second voltage that is higher than the first voltage. Thus, the second memory portion may degrade or fail more quickly (e.g., after fewer read requests than the first memory portion) so that the data stored in the second memory portion may no longer reliably or accurately be read or retrieved while the data stored in the first memory portion may still be reliably or accurately read or retrieved. In the same or alternative embodiments, the first memory portion may be accessed less frequently than the second memory portion in response to an authentication request (e.g., in response to an authentication request, two read accesses of the second memory portion are performed and one read access of the first memory portion are performed). The first memory portion may be physically designed to become less reliable after a larger number of read accesses than the second memory portion. Thus, the design for the first memory portion may be different than the second memory portion so that the second memory portion may degrade or fail earlier in response to read accesses associated with an authentication process.

In some embodiments, the second memory portion 320 may correspond to a canary memory cell of a resistive memory. For example, the canary memory cell may not receive a mitigation action from a memory disturbance mitigation circuitry 315 to correct or eliminate a memory disturbance or read disturb accumulation. The resistive memory may be arranged in rows of memory cells where each row may include one canary memory cell so that the canary memory cell accumulates a memory disturbance condition in response to successive read accesses of the row while the other memory cells of the row may be associated with a mitigation operation that removes or mitigates the memory disturbance condition after a particular number of read accesses of the row. As described in further detail with regard to FIG. 4, when the canary memory cell (or the second memory portion 320) is in an unreliable state as a result of an accumulation of a memory disturbance condition from repeated read accesses, a corrective action may be performed to the data stored at the first memory portion 310 or the data stored in the row that includes the canary memory cell or all of the rows.

Figure 3B:
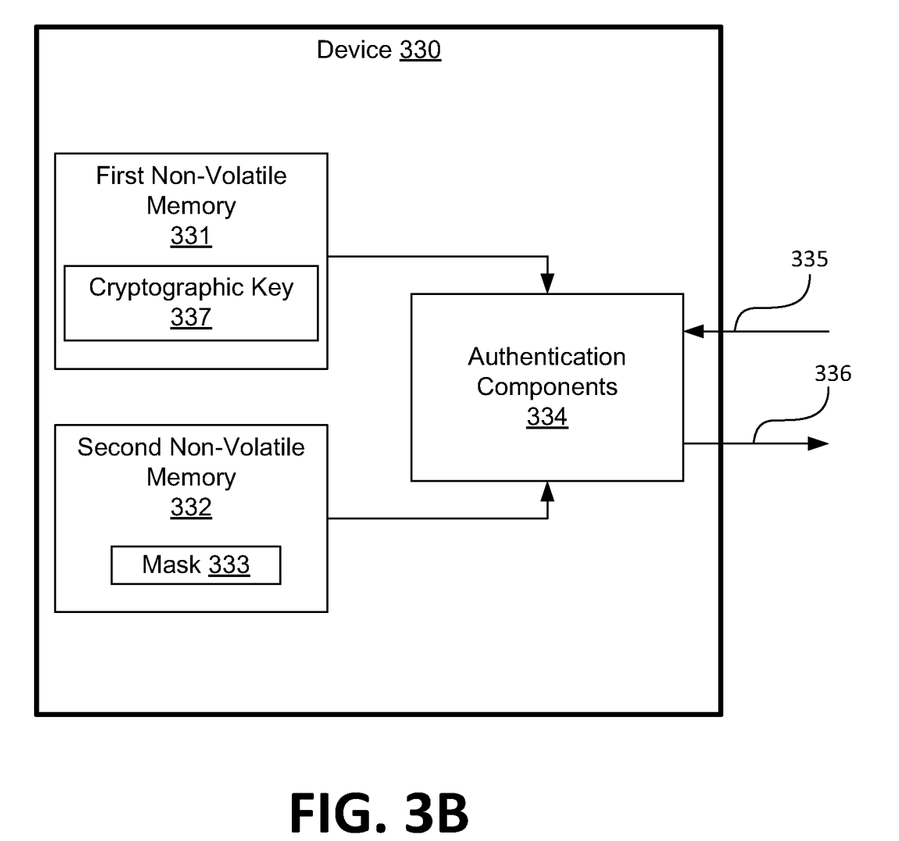
FIG. 3B is a block diagram of an example first and second non-volatile memory where the second non-volatile memory is used to mask data from the first non-volatile memory in accordance with some embodiments of the present disclosure.

FIG. 3B is a block diagram of an example device 330 with first and second non-volatile memories 331 and 332 where the second non-volatile memory 332 is used to mask data from the first non-volatile memory 331. In general, the device 330 may correspond to the device 100 of FIG. 1.

As shown in FIG. 3B, the device 330 may include a first non-volatile memory 331 and a second non-volatile memory 332. The first non-volatile memory 331 may be an OTP memory that stores a cryptographic key 337 and the second non-volatile memory 332 may be a resistive memory that stores a mask 333. The device 330 may further include authentication components 334 that receives an authentication request 335 and generates an authentication proof 336 in response to the authentication request 335. The authentication proof 336 may be generated based on a combination of a cryptographic key 337 stored at the OTP memory corresponding to the first non-volatile memory 331 and the mask 333 stored at the resistive memory corresponding to the second non-volatile memory 332. The mask 333 may correspond to additional data that is to be used in an operation with the cryptographic key 337 to generate the authentication proof 336. For example, the mask 333 may be data that is to be used in an exclusive-or (XOR) operation with the cryptographic key 337 that is used to generate another cryptographic key that is used by the authentication components 334 to generate the authentication proof 336. The OTP memory and the resistive memory may be associated with different memory disturbance conditions so that the resistive memory may become unreliable earlier or sooner in response to a threshold number of read accesses of the mask 333. For example, after a threshold number of read accesses of the mask 333 (e.g., in response to a corresponding number of threshold authentication requests 335) has been exceeded, then the resistive memory may be unreliable and the mask 333 may no longer be accurately stored in the resistive memory (e.g., bit values when read may not accurately reflect the original data values). As such, in response to a subsequent authentication request 335, the authentication proof 336 may not be valid as the combination of the mask 333 and the cryptographic key 337 may not generate a valid authentication proof.

Figure 3C:
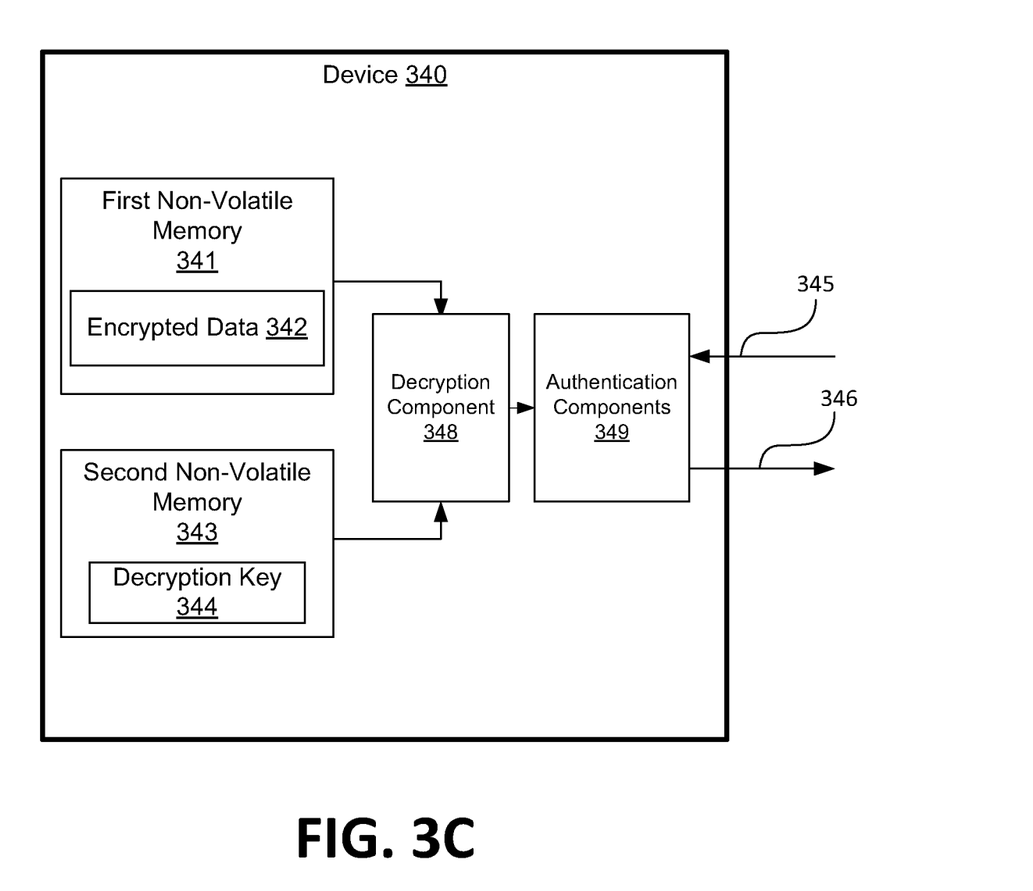
FIG. 3C is a block diagram of an example first and second non-volatile memory where the second non-volatile memory stores a decryption key for data stored at the first non-volatile memory in accordance with some embodiments of the present disclosure.

FIG. 3C is a block diagram of an example device 340 with a first and second non-volatile memory where the second non-volatile memory 343 stores a decryption key 344 for encrypted data 342 stored at the first non-volatile memory 341. In general, the device 340 may correspond to the device 100 of FIG. 1.

As shown in FIG. 3C, the second non-volatile memory 343 may be a resistive memory and the first non-volatile memory 341 may be another type of non-volatile memory (e.g., OTP memory). In response to an authentication request 345, a read access of the decryption key 344 stored at the resistive memory corresponding to the second non-volatile memory 343 and a read access of the encrypted data 342 stored at the OTP memory corresponding to the first non-volatile memory 341 may be performed. A decryption component 348 may decrypt the encrypted data 342 with the decryption key 344 to generate a cryptographic key that is used by authentication components 349 to generate an authentication proof 346. As such, when the second non-volatile memory 343 becomes unreliable in response to an accumulation of a memory disturbance condition from repeated read accesses of the decryption key 344, the decryption component 348 may not successfully decrypt the encrypted data 342 that is stored at the first non-volatile memory 341.

Figure 4:
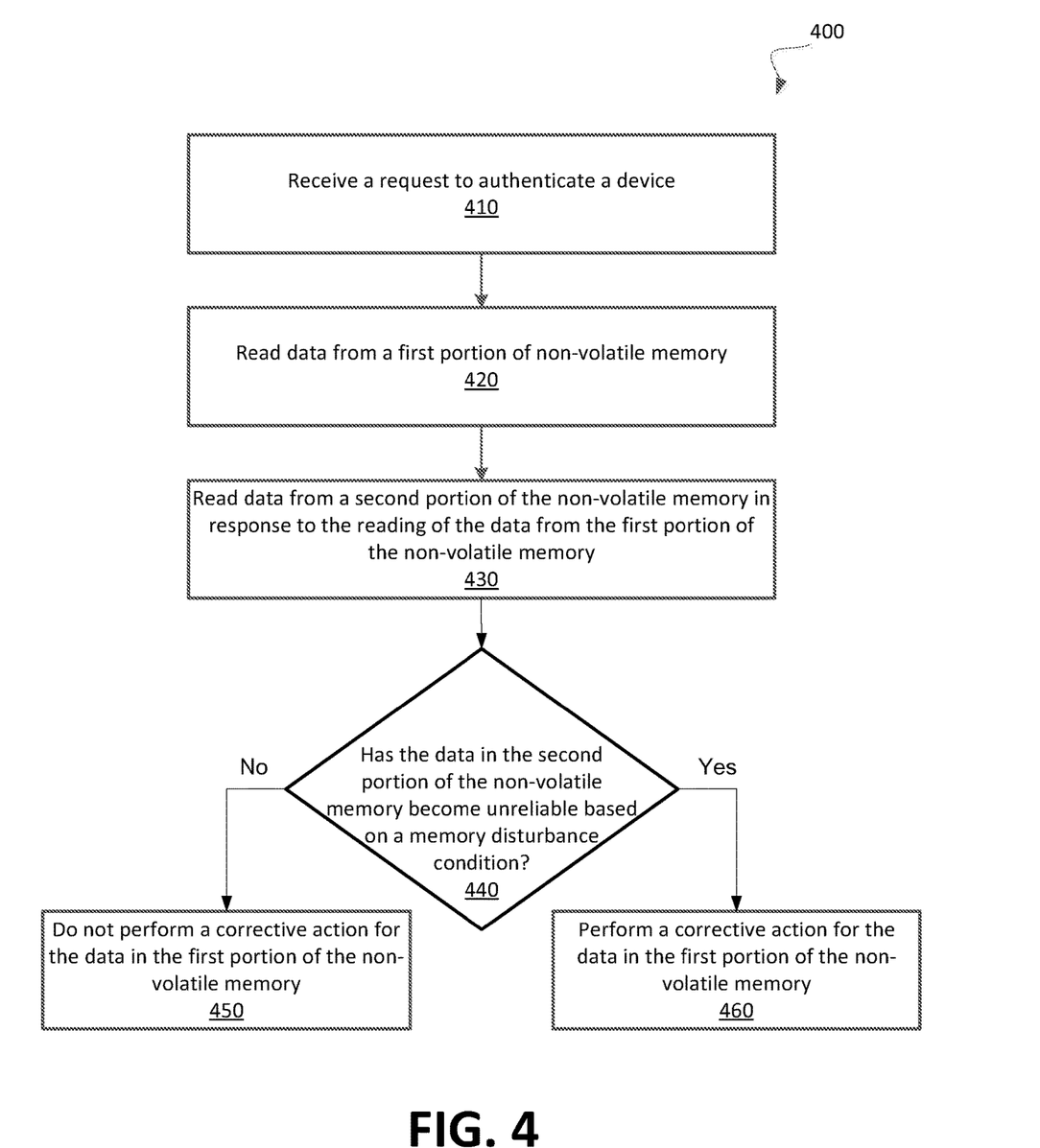
FIG. 4 is a flow diagram of an example method to perform a corrective action for data that is used to authenticate a device and that is stored in a non-volatile memory based on a memory disturbance condition in accordance with some embodiments.

FIG. 4 is a flow diagram of an example method 400 to perform a corrective action for data that is used to authenticate a device and is stored in a non-volatile memory based on a memory disturbance condition. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the authentication components 130 of FIG. 1.

As shown in FIG. 4, the method 400 may begin with the processing logic receiving a request to authenticate a device (block 410). In response to the request to authenticate the device, the processing logic may read data from a first portion of a non-volatile memory (block 420). For example, a read access to retrieve data stored at a first portion of a resistive memory may be performed. In some embodiments, the first portion of the resistive memory may be associated with circuitry that removes or mitigates a memory disturbance condition in response to multiple read accesses. The processing logic may further read data from a second portion of the non-volatile memory in response to the reading of the data from the first portion of the non-volatile memory (block 430). For example, the second portion of the non-volatile memory may be a portion of the resistive memory that is not associated with circuitry that removes or mitigates the memory disturbance condition. In some embodiments, the second portion may be referred to as a canary cell of the resistive memory. Thus, when a request to authenticate the device is received, data may be retrieved from the first memory portion of the resistive memory where the data may be used in the generation of an authentication proof and a read access of data stored at the second memory portion may be performed.

Referring to FIG. 4, the processing logic may determine whether the data stored in the second portion of the non-volatile memory has become unreliable based on a memory disturbance condition (block 440). For example, a determination may be made as to whether the data stored in the portion of the non-volatile memory that is not associated with a memory disturbance mitigation operation has become unreliable. The memory disturbance condition may correspond to a read disturb condition. If the second portion of the non-volatile memory has not become unreliable, then the processing logic may determine to not perform a corrective action for the data in the first portion of the non-volatile memory (block 450). Otherwise, if the second portion of the non-volatile memory has become unreliable based on the memory disturbance condition, then the processing logic may determine to perform a corrective action for the data stored in the first portion of the non-volatile memory.

The corrective action may correspond to reprogramming the first portion of the non-volatile memory to change the data stored at the first portion from a first value to a second value. For example, the values at each memory cell of the first portion of the non-volatile memory may be set to the same value (e.g., a value corresponding to '0' or a value corresponding to '1'). In some embodiments, the corrective action may correspond to modifying circuitry of a device that includes the non-volatile memory. For example, the circuitry of the device that generates an authentication proof based on the data from the first portion of the non-volatile memory may be modified to generate a same output (e.g., a value corresponding to '0' or a value corresponding to '1').

As such, the corrective action may be performed if a portion of a resistive memory indicates a threshold accumulation of a memory disturbance condition. The corrective action may reprogram the other data stored in the resistive memory if the memory disturbance condition indicates that the other portion of the resistive memory has become unreliable.

Figure 5:
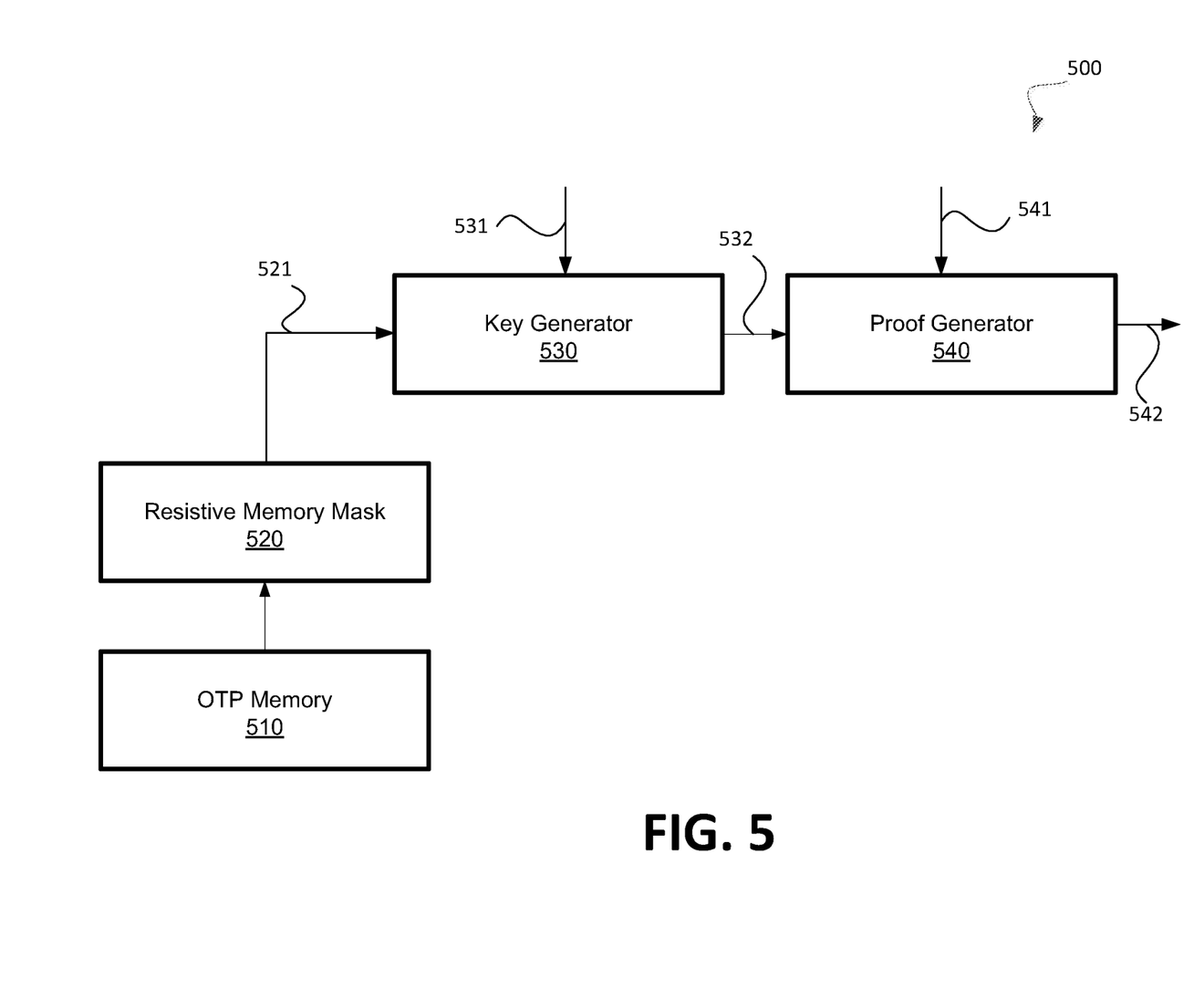
FIG. 5 illustrates a block diagram of an example environment to generate an authentication proof by using different types of non-volatile memory in accordance with some embodiments of the present disclosure.

FIG. 5 illustrates a block diagram of an example device 500 to generate authentication data by using different types of non-volatile memory. In general, the device 500 may correspond to the device 100 of FIG. 1.

As shown in FIG. 5, the device 500 may include an OTP memory 510 (e.g., a first non-volatile memory), a resistive memory 520 (e.g., a second non-volatile memory), a key generator 530, and an authentication proof generator 540. In response to a request to authenticate the device 500, read accesses of the OTP memory 510 and the resistive memory 520 may be performed to generate a first cryptographic key 521. A first challenge 531 may be received by the device 500 and the key generator 530 may generate a second cryptographic key 532 based on a combination of the first cryptographic key 521 and the data of the first challenge 531. In some embodiments, the device 500 may transmit the second cryptographic key 532 to a verifier device that has transmitted the authentication request to the device 500 and if the second cryptographic key 532 is verified, then the device 500 may receive a second challenge 541. For example, the proof generator 540 of the device 500 may receive the second challenge 541 and the second cryptographic key 532 and may generate an authentication proof 542. Furthermore, the authentication proof 542 may then be transmitted to the verifier device that transmitted the authentication request. If the authentication proof 542 that is transmitted matches another authentication proof generated by the verifier device or known to the verifier device, then the device 500 may be considered to be successfully authenticated and may then interact with the verifier device.

Figure 6:
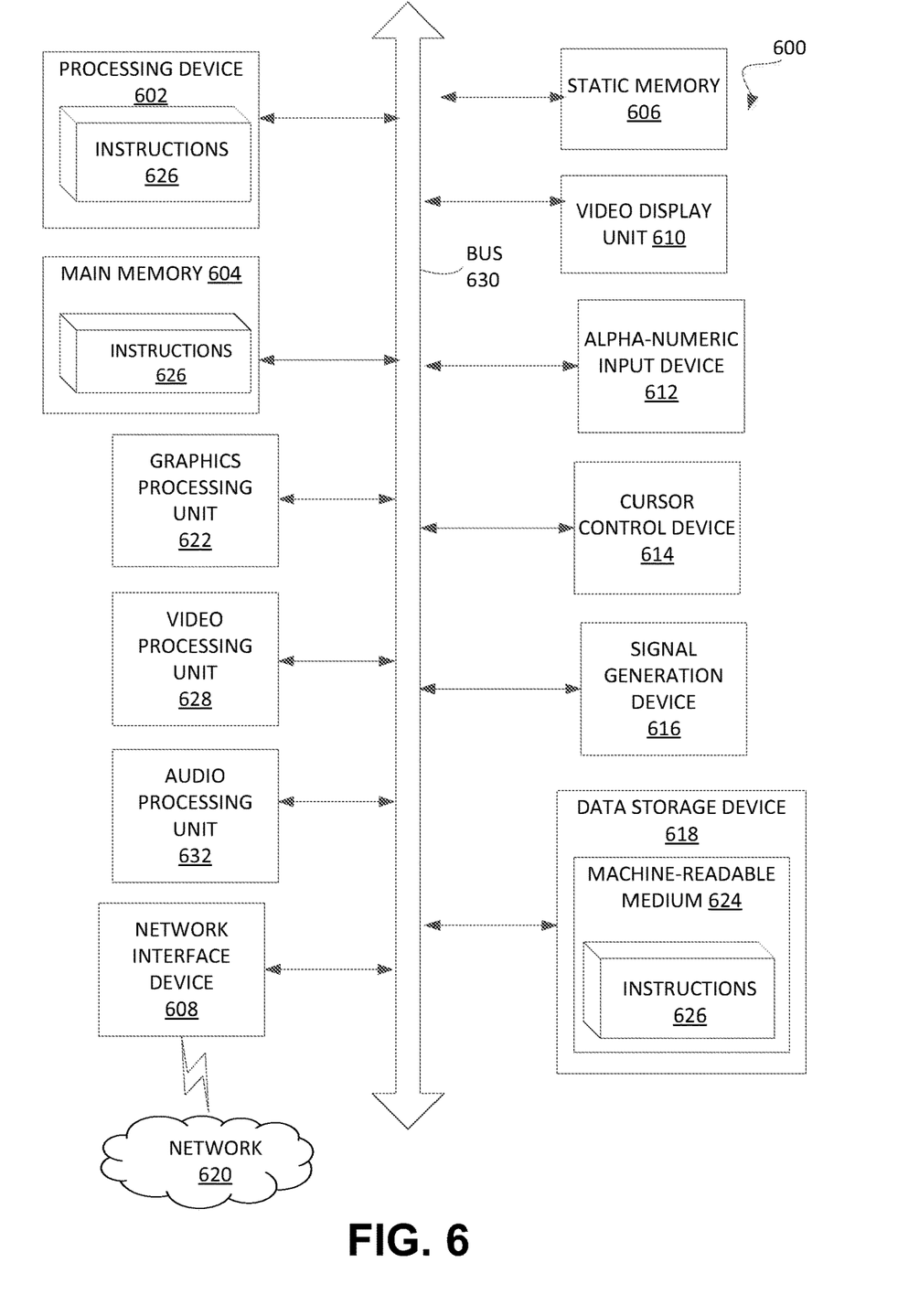
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality as described herein (e.g., the authentication components 130 of FIG. 1). While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving a request to perform an authentication operation;
   in response to the request to perform the authentication operation, reading a cryptographic key that is a subject of a recovery operation, the cryptographic key being stored at a first non-volatile memory;
   in response to the request to perform the authentication operation, reading additional data for which the recovery operation is not to be performed, the additional data being stored at a second non-volatile memory; and
   generating an authentication proof based on the cryptographic key read from the first non-volatile memory and the additional data read from the second non-volatile memory.

2. The method of claim 1, wherein the recovery operation corresponds to reprogramming the cryptographic key stored at the first non-volatile memory.

3. The method of claim 1, further comprising:
   determining whether a threshold number of read accesses have been performed for the cryptographic key stored at the first non-volatile memory, wherein the recovery operation is performed for the cryptographic key in response to determining that the threshold number of read accesses have been performed for the cryptographic key.

4. The method of claim 1, wherein the first non-volatile memory is a one-time programmable (OTP) memory and the second non-volatile memory is a resistive memory.

5. The method of claim 1, wherein the recovery operation corresponds to an application of a voltage pulse to the first non-volatile memory.

6. The method of claim 1, wherein the recovery operation is associated with read disturb of the first non-volatile memory.

7. The method of claim 1, wherein the cryptographic key is encrypted and the additional data corresponds to another key, wherein generating the authentication proof comprises:
decrypting the encrypted cryptographic key with the another key.

8. A system comprising:
a first non-volatile memory storing a cryptographic key;
a second non-volatile memory storing additional data;
a circuit to perform a recovery operation for the cryptographic key stored at the first non-volatile memory without performing the recovery operation for the additional data stored at the second non-volatile memory;
a processing device, operatively coupled with the first non-volatile memory and the second non-volatile memory, to:
receive a request to perform an authentication operation;
in response to the request to perform the authentication operation, read the cryptographic key stored at the first non-volatile memory for which the recovery operation is performed and read the additional data stored at the second non-volatile memory for which the recovery operation is not performed; and
generate an authentication proof based on the cryptographic key read from the first non-volatile memory and the additional data read from the second non-volatile memory.

9. The system of claim 8, wherein the recovery operation corresponds to reprogramming the cryptographic key stored at the first non-volatile memory.

10. The system of claim 8, wherein the circuit is further to:
determine whether a threshold number of read accesses have been performed for the cryptographic key stored at the first non-volatile memory, wherein the recovery operation is performed for the cryptographic key in response to determining that the threshold number of read accesses have been performed for the cryptographic key.

11. The system of claim 8, wherein the first non-volatile memory is a one-time programmable (OTP) memory and the second non-volatile memory is a resistive memory.

12. The system of claim 8, wherein the recovery operation corresponds to an application of a voltage pulse to the first non-volatile memory.

13. The system of claim 8, wherein the recovery operation is associated with read disturb of the first non-volatile memory.

14. The system of claim 8, wherein the cryptographic key is encrypted and the additional data corresponds to another key, and wherein to generate the authentication proof, the processing device is further to:
decrypt the encrypted cryptographic key with the another key.

15. A non-transitory computer readable medium comprising instructions, which when executed by a processing device, cause the processing device to perform operations comprising:
receiving a request to perform an authentication operation;
in response to the request to perform the authentication operation, reading a cryptographic key that is a subject of a recovery operation, the cryptographic key being stored at a first non-volatile memory;
in response to the request to perform the authentication operation, reading additional data for which the recovery operation is not to be performed, the additional data being stored at a second non-volatile memory; and
generating an authentication proof based on the cryptographic key read from the first non-volatile memory and the additional data read from the second non-volatile memory.

16. The non-transitory computer readable medium of claim 15, wherein the recovery operation corresponds to reprogramming the cryptographic key stored at the first non-volatile memory.

17. The non-transitory computer readable medium of claim 15, the operations further comprising:
determining whether a threshold number of read accesses have been performed for the cryptographic key stored at the first non-volatile memory, wherein the recovery operation is performed for the cryptographic key in response to determining that the threshold number of read accesses have been performed for the cryptographic key.

18. The non-transitory computer readable medium of claim 15, wherein the first non-volatile memory is a one-time programmable (OTP) memory and the second non-volatile memory is a resistive memory.

19. The non-transitory computer readable medium of claim 15, wherein the recovery operation corresponds to an application of a voltage pulse to the first non-volatile memory.

20. The non-transitory computer readable medium of claim 15, wherein the recovery operation is associated with read disturb of the first non-volatile memory.

* * * * *